No. 613,135. Patented Oct. 25, 1898.
A. S. FRAZER.
ALTERNATING CURRENT ELECTRIC MOTOR.
(Application filed Dec. 28, 1897.)
(No Model.) 2 Sheets—Sheet 1.
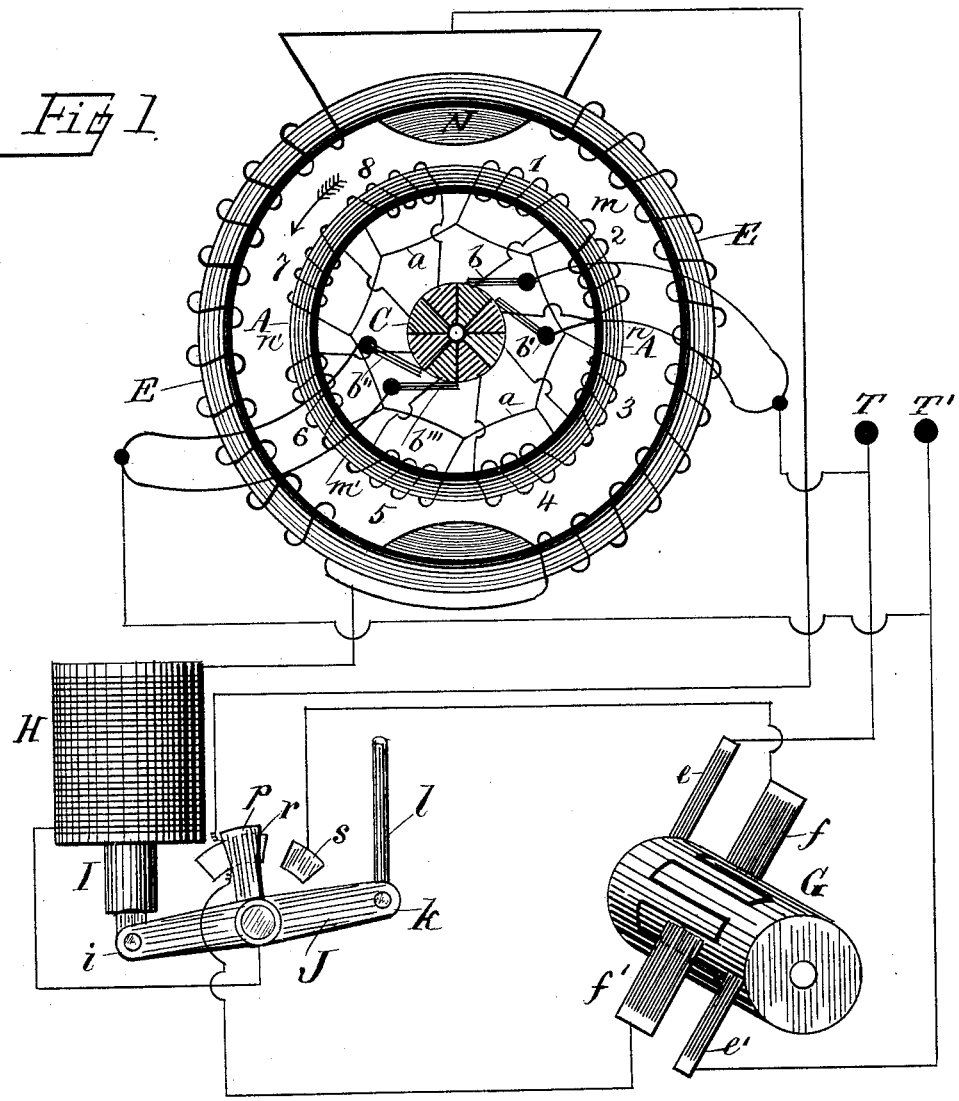

No. 613,135. Patented Oct. 25, 1898.
A. S. FRAZER.
ALTERNATING CURRENT ELECTRIC MOTOR.
(Application filed Dec. 28, 1897.)
(No Model.) 2 Sheets—Sheet 2.
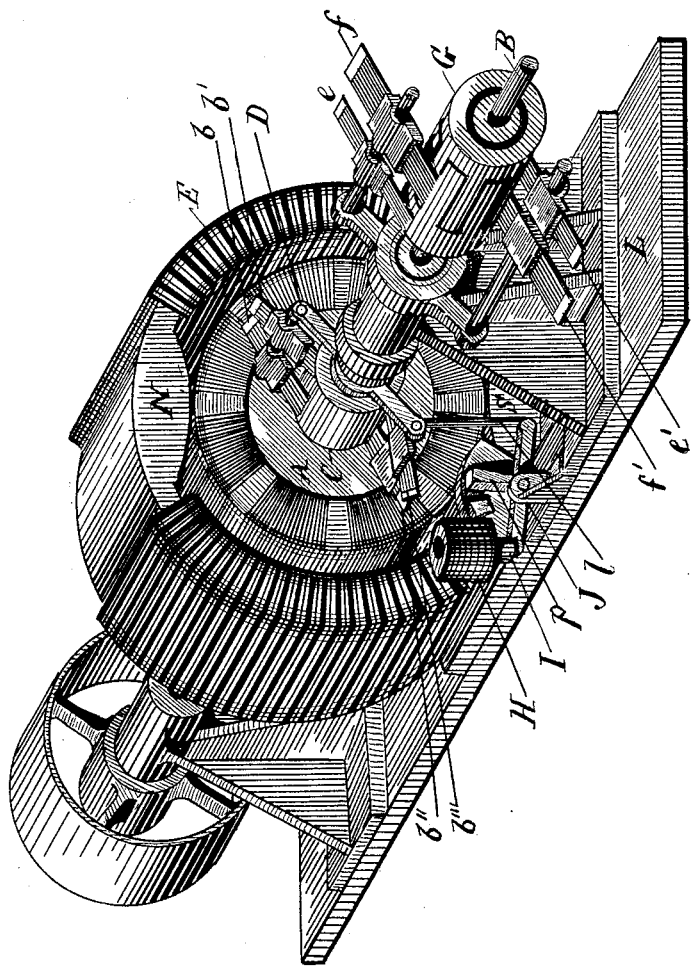
Fig II
Witnesses
William McDonald
Albert William Parr
Anthony String Frazer
Inventor
per
Fred'k Walker
Attorney
THE NORRIS PETERS CO., PHOTO-LITHO., WASHINGTON, D. C.

UNITED STATES PATENT OFFICE.

ANTHONY STRONG FRAZER, OF TYNEMOUTH, ENGLAND.

ALTERNATING-CURRENT ELECTRIC MOTOR.

SPECIFICATION forming part of Letters Patent No. 613,135, dated October 25, 1898.

Application filed December 28, 1897. Serial No. 663,838. (No model.) Patented in England March 11, 1896, No. 5,479, and in France April 1, 1897, No. 253,220.

*To all whom it may concern:*

Be it known that I, ANTHONY STRONG FRAZER, a subject of Her Majesty the Queen of Great Britain, residing at 19 Percy Gardens, Tynemouth, in the county of Northumberland, England, have invented new and useful Improvements in Alternating-Current Electric Motors and Commuting Devices in Connection Therewith, (for which I have obtained a patent in Great Britain, No. 5,479, bearing date March 11, 1896, and also in France, No. 253,220, bearing date April 1, 1897,) of which the following is a specification.

I am aware that systems for operating alternate-current motors by producing uniformly-rotating magnetic fields are not new; but such systems can only be applied to polyphase currents or to single or monophase currents which by various devices have been split into two or more phases.

According to my invention I employ true single or monophase alternating currents; and the actual invention consists in the method employed to cause such currents to energize successively as magnetic poles certain equidistant points of a suitably-wound laminated ring forming the rotor, and thereby to produce a uniformly rotatory magnetic field the opposite active poles of which react on those of a bipolar-ring stator which surrounds the rotor. To the spindle of the rotor is fixed a double crown-wheel commutator, the projecting teeth of which are insulated from each other, forming a commuting or rectifying device over which is passed (directly that synchronous speed is attained) the impulses of an alternating current then made unidirectional for the purpose of energizing the coils of the stator, the poles of which then maintain between them a magnetic field of irregular intensity but of constant direction. Impressed current is used for both the rotor and stator elements of the motor, and the arrangements of parts may be such as to take the current in series or as a shunt or in parallel circuit relatively to each other. It is also obvious that I may use suitably reversed and alternated continuous or direct current in lieu of the alternating current to energize either the stator or rotor separately or both together. I attain these objects by the mechanism illustrated in the accompanying two sheets of drawings, in which—

Figure 1 is a diagrammatic view of the several parts and electrical connections and is not drawn to scale, and the aforesaid parts are divided for the clearer enunciation thereof. Fig. 2 is a perspective view of the device.

Similar letters and figures of reference indicate like parts throughout the drawings.

Referring to the drawings, I employ a rotor A, formed of a laminated-iron-ring core of suitable dimensions, which may be plain or cogged, as in a Pacinotti ring, mounted upon a spindle or shaft B, and wound in the example chosen for illustration with eight coils of equal caliber similar to an ordinary Gramme ring, with the exception that the different coils or sections of winding are arranged in alternately opposite directions, the finishing ends of each coil being joined to a common conducting-ring $a$, the entering ends being connected to the corresponding segments of a commutator C, which are insulated from each other and also from the spindle B. Two pairs of brushes $b\ b'$ and $b''\ b'''$ bear upon said commutator C and are supported by a rocking arm D, Fig. 2, the disposition of said brushes being so that while each brush of one pair is in contact with two segments of the commutator contiguous to each other the opposite pair simultaneously are in contact with two opposite segments. Each pair of brushes $b\ b'\ b''\ b'''$ are connected to the terminals T T' of the electrical supply, said pairs being coupled in parallel, as shown by Fig. 1. In the position illustrated by the drawings a pair of double magnetic poles $m\ m'$ are formed upon the ring A by the brushes $b\ b'\ b''\ b'''$ making contact with the segments of the commutator C, corresponding to the coils 1, 2, 5, and 6, respectively, the path of the current being in parallel circuit from the terminal T through the brushes $b\ b'$ and coils 1 and 2, through the common conducting-ring $a$, and the coils 5 and 6, brushes $b''\ b'''$, back to the terminal T. The rotation of the ring A in the direction of the arrow causes the commutator-segments corresponding to the coils 1 and 5 to break contact with the brushes $b\ b'''$, the current now traversing the coils 2 3 and 6 7, transferring the magnetic polarity to the points $n\ n'$ of the ring A, said polarity being, however, of opposite signs. If a single-phase alternating current be supplied and the ring A rotated in synchronism with the periodicity of such current, so that for every alternate positive or negative impulse a fresh commutator-segment passes into contact with the brushes $b\ b'\ b''\ b'''$, (when the currents are at zero potential,) it is evident that a pair of double poles constant in name or sign but varying in intensity will be maintained at one point relatively to space, but traveling back uniformly relatively to the rotating core. I may apply the same device and method to a stator-ring in place of the bipolar stator E shown by the drawings, using in this case a bipolar rotor and attaching the segmental commutator C to the bearing-standard, so that it may surround the spindle B, but not revolve with it, and I affix the arms carrying the brushes to said spindle B, so that said brushes revolve in lieu of the commutator C, as aforesaid, thus producing a pair of rotating poles on the stator-ring.

In the case illustrated by the drawings I employ a stator-ring E of suitable dimensions, preferably having convex poles N S. Said stator is mounted upon a bed-plate F, Fig. 2, and its coils are excited either in series or as a shunt from the main circuit T T', which is passed over a double-crown-wheel commutator G, the segments of which are interlocked and insulated from each other. Said double crown-wheel G is fixed to and revolves with the spindle B and receives the current by end brushes $e\ e'$, making contact with the body of each crown-wheel, and the rectified or commuted current is led to the stator-coils from the brushes $f\ f'$. The adjustment of these brushes is arranged relatively to the rotor-brushes $b\ b'\ b''\ b'''$ so that when the motor has attained synchronous speed the rectified or commuted current energizes the stator-coils and impresses the maximum polarity thereon at the same instant that the then-approaching traveling poles have also reached their maximum intensity.

I wind the respective coils of the rotor A and the stator E as above described, so that the relative impedance and ohmic resistance of the stator-coils may as nearly as possible equal those of the energized coils on the rotor-ring when both are energized in shunt from the main circuit and the rotor running synchronously with the periodicity. Owing to the mutual reactions of current-lag in both stator and rotor when running light with but a negligible slip, the current traversing the coils is nearly wattless; but on applying the load and in exact proportion to the amount of said load a tendency to slip will arise, disturbing the inductive reactions and consuming more energy to maintain synchronous speed and torque. The convex shape of the stator-poles N S, the mechanical rotation of the polarity around the rotor-ring, with the fact that the current energizing the stator is impressed in unison therewith, combine to divide the possible slip among the sections between the polar-points intersecting the coils, and the brushes $b\ b'\ b''\ b'''$ may be relatively adjusted to permit of at least twenty per cent. such slip occurring before the mutual reaction in the stator and rotor is sufficiently disturbed to destroy the torque. Consequently an overloading intermittently applied will not stop or appreciably alter the speed of the motor. To provide against a stoppage of the motor by the application of a momentary overload beyond the normal limit and also to act as a starting device for conditions of excessive torque, I place in the rectified or commuted stator-circuit a solenoid-coil H, with a suitable plunger-core I. Said solenoid-coil is so wound and arranged that when the current traversing it is unidirectional the core I is drawn up into it. The lower end of the core I is jointed to one end $i$ of a pivoted lever or beam J. The other end $k$ of the lever J is jointed to a rod $l$, which operates the rocking arm D, carrying the brushes $b\ b'\ b''\ b'''$. To the lever or beam J is also attached a switch-arm $p$ with two contacts $r\ s$, which correspond to the upward and downward movements of the lever or beam J and the core I. The operation of this device is as follows—that is to say, when at rest and the core I of the solenoid H is in its lowest position the end $k$ of the lever J is raised, and the rod $l$, acting upon the rocking arm, causes each of the rotor-brushes $b\ b'\ b''\ b'''$ to be held one segment behind their normal full-load position, and at the same time the switch-arm $p$ is in contact with the contact-plate $r$, and the arrangement of the circuit, as shown by Fig. 1, places the stator-coils in closed circuit, including the solenoid-coils H. When the current is switched onto the main circuit T T', the energizing-current traverses the rotor-coils only, generating induced currents in the stator-coils, and the starting alternating polarity of the rotor, owing to the position of the brushes $b\ b'\ b''\ b'''$ at that period, exercises the maximum pull on the induced alternating polarity of the stator, and the motor starts and runs up to nearly synchronism with considerable torque. The stator is then energized by currents of low frequency and the core I is drawn up into the solenoid H, raising the end $i$ of the lever J and moving the brushes forward by the rod $l$ and rocking lever D. The switch-arm $p$ is at the same time and by the same action moved to make contact with the contact-plate $s$, thus affording at this stage the rectified or commuted current for energizing the stator. The connections are plainly set forth by the diagrammatic view Fig. 1 and may be readily traced, so that the several leads or wires do not need numerical signification.

What I claim, and desire to secure by Letters Patent of the United States, is—

1. In an alternating electric motor, the combination of a stator and rotor with a commutator consisting of one cylinder concentrically within the same, two pairs of brushes arranged for contact with the segments of the said commutator, a series of alternately-reversed windings on the said rotor, corresponding to the said segments, the coils of the stator relatively reversed for bipolarity, circuit connections to the said windings and brushes, of the said rotor, short-circuit connections for the coils of the stator and shunt-circuit connections thereto from the main circuit the arrangement of the foregoing parts being such that a monophase current will produce a progressive or traveling polarity of the rotor by the contact of the said sets of brushes with the said commutator substantially as set forth.

2. In an alternating electric motor; the combination of a rotor wound as described with a main circuit and connections energizing the said rotor, a bipolar stator arranged to be energized through short-circuiting connections by the induced current created by said rotor, as well as by a shunt from the main circuit, a commutator turning with the said rotor for directing the current to the same, an additional commutator for rectifying the current to the said stator, means for automatically shunting the commutator into circuit with said stator when the rotor has approached to synchronism and the necessary brushes in contact with the commuator first mentioned for energizing the said rotor, the windings of the coils on the latter and the construction and arrangement of the parts hereinbefore mentioned being such that there are in the said motor, when in normal operation a pair of poles constant in sign but traveling back uniformly relatively to the rotating core substantially as set forth.

3. In an alternating electric motor the combination of a rotor provided with windings connected to a commutator and main-circuit conductors supplying current to the said rotor with a stator polarized by induction, a solenoid in circuit with the coils of the said stator, a core or plunger for the said solenoid the brushes of the said commutator and devices intervening between the said core and the said brushes whereby the latter are automatically shifted forward on the said commutator by the action of the said solenoid when the speed of the rotor approaches synchronism substantially as set forth.

4. In an alternating electric motor, a rotor, commutator C, brushes in contact with said commutator and electric connections for energizing the same, in combination with a stator energized by induction and also by a shunt-current of the main circuit, a commutator G in the shunt-circuit operating as a converter or rectifier of the current, a solenoid continuously in circuit with the coils of said stator, a core or plunger of said stator which is drawn up into the said solenoid when the rotor approaches synchronism, an oscillating device connected to said core, a switch carried by said oscillating device, a pair of contact-plates, $r$, $s$, with which the said switch is in contact respectively when the core is withdrawn and when it is protruded, a set of brushes and electric connections for directing this current through the said commutator G and the stator when the switch is in contact with plate $s$ and a brush-support carried by the said oscillating device and operating to move forward the brushes or commutator C, when the current from the main circuit is thus in part shunted through the coils of the stator substantially as set forth.

5. Two commutators C, and G, the latter being of the crown-wheel type, in combination with a rotor and bipolar stator both of which have coils wound thereon and which are arranged concentrically with commutator C, means for automatically directing a shunt-circuit through the said stator, connections whereby the said means are actuated by the induced current of the said stator when the said rotor attains synchronism, devices actuated by the said means for simultaneously shifting forward the brushes of commutator C, and electric connections and brushes for bringing the commutator G into the shunt-circuit that it may serve as a rectifier of the current, when the said shunt-circuit is closed through the said stator substantially as set forth.

ANTHONY STRONG FRAZER.

Witnesses:
WILLIAM McDONALD,
ALBERT WILLIAM PARR.